April 24, 1962

G. R. BODKINS 3,030,735

PLANTER

Filed Nov. 17, 1960

INVENTOR.
G. RICHARD BODKINS
BY
Woodhams, Blanchard and Flynn
ATTORNEYS

April 24, 1962  G. R. BODKINS  3,030,735
PLANTER

Filed Nov. 17, 1960  3 Sheets-Sheet 2

INVENTOR.
G. RICHARD BODKINS
BY
ATTORNEYS

April 24, 1962  G. R. BODKINS  3,030,735
PLANTER
Filed Nov. 17, 1960  3 Sheets-Sheet 3

INVENTOR.
G. RICHARD BODKINS
BY
Woodhams, Blanchard & Flynn
ATTORNEYS

United States Patent Office 3,030,735
Patented Apr. 24, 1962

3,030,735
PLANTER
George Richard Bodkins, 424 Rust Park Drive,
Grand Blanc, Mich.
Filed Nov. 17, 1960, Ser. No. 69,973
6 Claims. (Cl. 47—39)

This invention relates to an improved planter structure, and, more particularly, relates to an improved structure for mounting a planter box in vertically adjustable position upon a vertical pole.

While a wide variety of planter structures have been suggested for office and residential uses, these have not been found to be completely satisfactory. Masonry structures are expensive and not movable and this materially restricts the freedom of a decorator attempting to change the decor of a room. Many planter structures are merely attached in various ways to the walls of a room but this is undesirable because of the risk that they will accidentally become loosened, fall and be broken and, possibly, damage other property or occupants of the room. Moreover, they leave disfiguring marks, such as screw holes, on the walls of the room when they are mounted and such require patching and, frequently, redecoration of the entire room. Further, interesting effects can be created by providing lighted planters but heretofore it has not been possible to provide same in a relatively low cost unit. Thus, a substantial need exists for a relatively inexpensive, portable, lighted planter unit which does not require permanent installation or the use of fasteners to hold same in the desired position. The present invention is intended to meet this need.

Accordingly, it is an object of this invention to provide an improved planter structure.

It is a further object of this invention to provide an improved planter structure, as aforesaid, which is mounted on a pole, which pole may be placed in a relatively fixed position without requiring the use of any fastening means, yet which may be readily moved from place to place when desired.

It is a further object of this invention to provide an improved planter structure, as aforesaid, which may be placed in various positions on the pole and which may be grouped with other similarly constructed planters on a common pole.

It is a further object of this invention to provide an improved planter structure, as aforesaid, which includes a light fixture mounted within a suitable protective casing, which casing also serves as a means for supporting the planter as a whole on the pole.

It is a further object of this invention to provide an improved planter structure, as aforesaid, which can be made in various sizes and shapes and which is relatively inexpensive to manufacture.

Other objects and advantages of the invention will become apparent to persons acquainted with devices of this type upon reading the following disclosure and inspecting the accompanying drawings.

Figure 1:
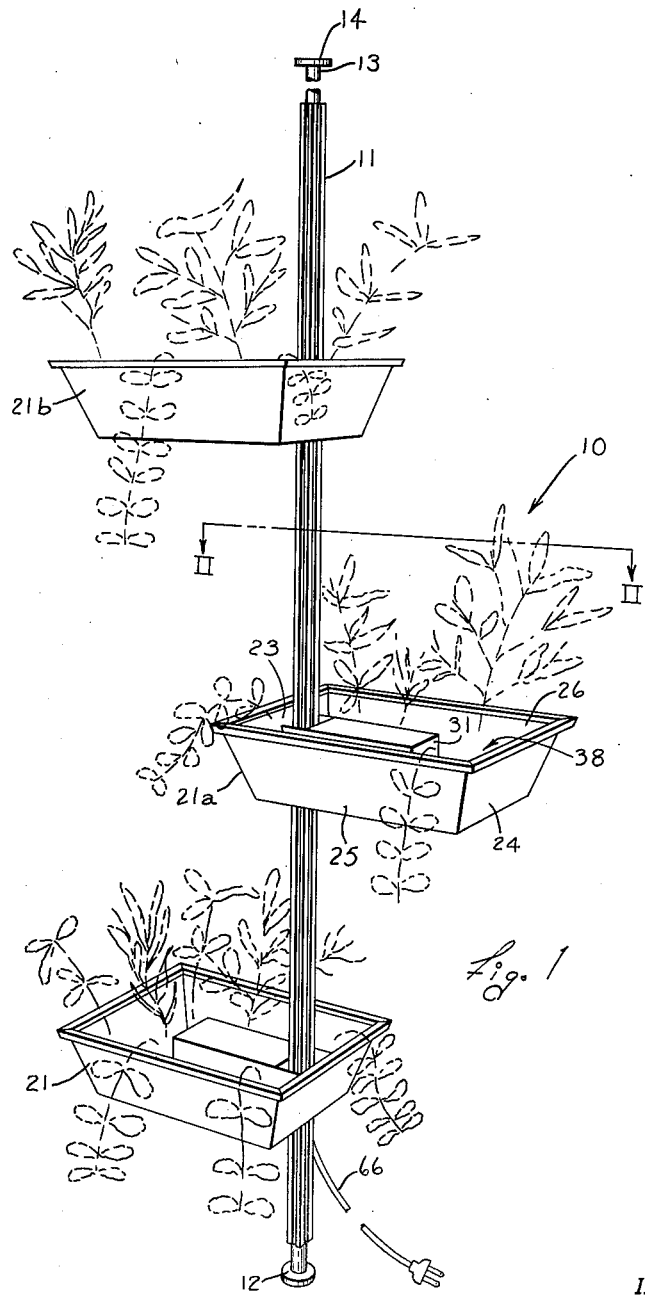
FIGURE 1 is an oblique view of a planter construction comprising a post and a plurality of planter boxes embodying the invention.
Figure 2:
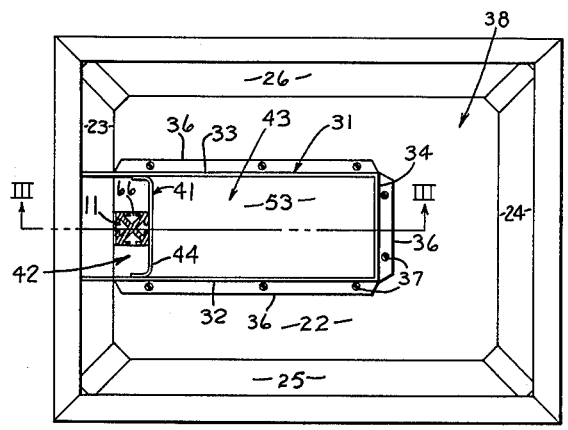
FIGURE 2 is a sectional view taken along the line II—II of FIGURE 1.
Figure 3:
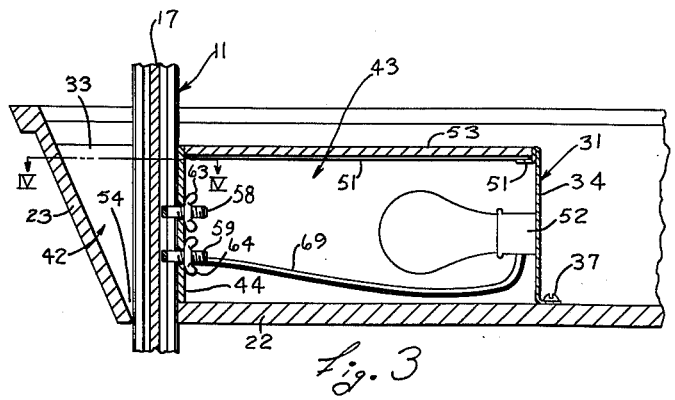
FIGURE 3 is a sectional view taken along the line III—III of FIGURE 2.

Referring to the drawings, the planter structure 10 comprises a vertical post 11 having a floor engaging pad 12 at the lower end thereof. A spring urged plunger 13 is telescopically received within the upper end of the post and it has a pad 14 at its upper end for engaging the ceiling of a room. The construction and mounting of plunger 13 is substantially the same as that which is conventional in pole-type lamps, for example, and needs no further detailing.

Figure 4:
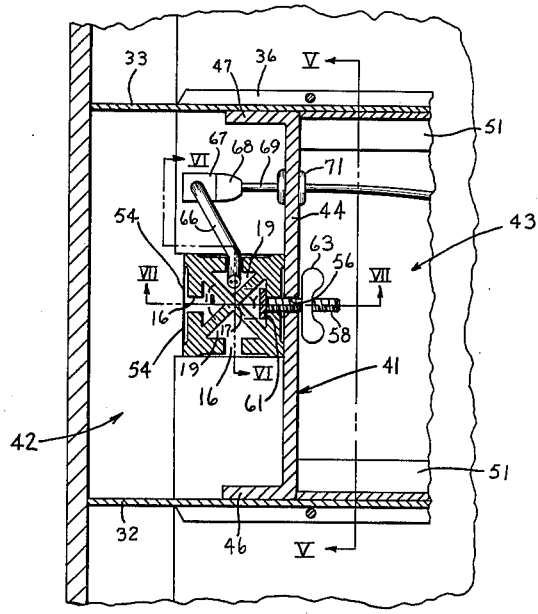
FIGURE 4 is an enlarged, sectional view taken along the line IV—IV of FIGURE 3.

The post 11, which desirably is a one-piece aluminum extrusion, is substantially square in cross section and it has a slot 16 (FIGURE 4) in each of the sides thereof. The post 11 has an integral central portion 17 and webs 18 extend from the central portion thereof to the corners thereof. This construction provides four substantially V-shaped grooves 19 therein, each of which communicates with a slot 16.

A plurality, here three, of planter boxes 21, 21a and 21b are mounted on the post. While the planter boxes 21, 21a and 21b may take a variety of shapes, in the preferred embodiment of the invention illustrated in the drawings the boxes 21 are identical and each comprises a base wall 22 and upwardly diverging end walls 23 and 24 and side walls 25 and 26.

A casing 31 is disposed within each of the planter boxes and said casing comprises a pair of side walls 32 and 33 and an end wall 34. The side walls 32 and 33 and end wall 34 have laterally extending flanges 36 at their lower edges which flanges lie against the base wall 22 of the planter box. The flanges 36 have openings therethrough and screws 37 extend through said openings and are screwed into the base wall 22 of the planter box whereby the casing 31 is rigidly secured thereto. The ends of the side walls 32 and 33 remote from the end wall 34 are upwardly inclined and lie against the end wall 23 of the planter box. The end wall 34 of the casing 31 is spaced from the opposite end wall 24 of the planter box. Thus, the casing 31 and the planter box 21 define a substantially U-shaped plant-receiving zone 38.

A U-shaped divider wall 41 divides the casing 31 into a pole-receiving compartment 42 and a light fixture-receiving compartment 43. The web 44 of the wall 41 extends transversely between the side walls 32 and 33 and legs 46 and 47 thereof extend along and are secured in any suitable manner, such as by welding, to the side walls 32 and 33.

The opposing surfaces of the side walls 32 and 33 within compartment 43 and the end wall 34 have flanges 51 extending laterally therefrom at points close to but offset downwardly from the upper edges thereof. Desirably, as shown, the flanges 51 are formed by reversely bending the upper portions of the walls and then bending the flanges 51 away therefrom. A light fixture 52 is mounted on the end wall 34 and is disposed entirely within the compartment 43. A translucent plate 53, which may be made of glass or suitable plastic material, overlies the light fixture and is supported on the flanges 51. Thus, the light fixture-receiving compartment 43 is closed so that dirt or other planting material in the plant-receiving zone 38 cannot pass thereinto.

Figure 7:
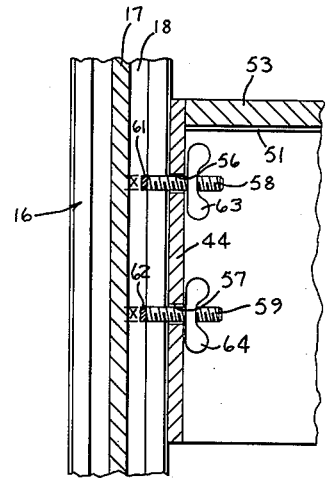
FIGURE 7 is an enlarged sectional view taken along the line VII—VII of FIGURE 4.
Figure 5:
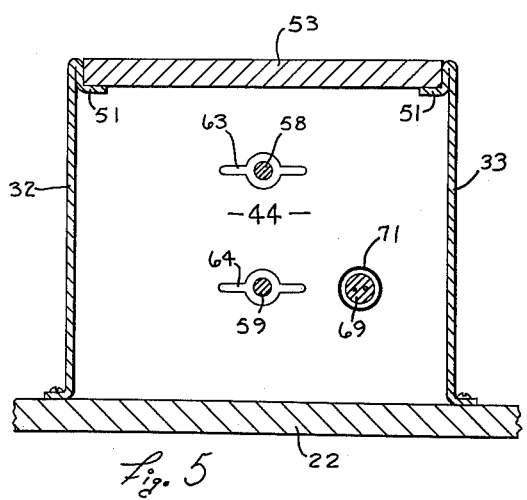
FIGURE 5 is a sectional view taken along the line V—V of FIGURE 4.

The post 11 extends upwardly through an opening 54 in the base wall 22 of the planter box and thence extends upwardly throgh the post-receiving compartment 42. The web 44 of the U-shaped divider wall 41 is disposed adjacent one side of the post 11 and is adapted to contact same. The web 44 has two vertically spaced openings 56 and 57 aligned with the slot 16 in the adjacent side of the post. Bolts 58 and 59 extend through the openings 56 and 57, respectively. The heads 61 and 62 of the bolts 58 and 59 are rectangular in shape and the minor dimension X thereof (FIGURE 7) is less than the width of the slot 16 while the major dimension Y thereof (FIGURE 4) is greater than the width of said slot. Thus, the bolt heads 61 and 62 can be inserted through the slot 16 when the long sides thereof are disposed parallel with the edges of said slot and said bolts can then be rotated through an angle of about 90 degrees so that the long sides thereof are then disposed transverse to the slot. When so positioned, the bolt heads cannot be moved through the slots. Wing-nuts 63 and 64 are threaded onto the bolts 58 and 59, respectively, and secure said bolts and thereby the casing 31 and the planter box 21 in vertically adjustable position on the post 11.

Figure 6:
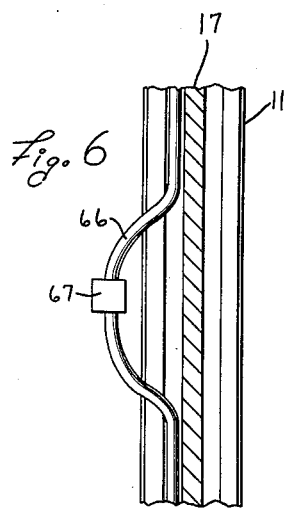
FIGURE 6 is a sectional view taken along the line VI—VI of FIGURE 4.

An electric cord 66 extends upwardly through one of the grooves 19 in the pole. As shown in FIGURE 6, in each of the planter boxes, the cord 66 is bent out of the groove 19 so that a portion of its extends into compartment 42, and said cord is thereafter bent back into the groove.

A clamp-on type electrical connector 67 is secured to the portion of conductor 66 disposed outside of the pole 11 within each of the planter boxes. Since suitable connectors of this type are well known, detailed disclosure thereof is believed to be unnecessary but, in general, this type of connector comprises a pair of prongs adapted to penetrate the insulation of the cord and contact the conductors therein. A mating electrical plug 68 cooperates with the connector 67 in conventional fashion. A further electric cord 69 extends from the plug 68 through a grommet 71 disposed within an opening in the wall 41 and thence through the compartment 43 below the light fixture 52 and is then connected to the socket of the light fixture in the manner shown. Thus, electrical energy supplied through the conductor 66 is effective to light the bulb of the light fixture 52.

In assembly, the appropriate number of planter boxes 21, each of which has a casing 31 secured thereto, are provided. Ordinarily, at the time the boxes are mounted on the post 11, they will not have dirt or plants therein. The post 11 is laid on its side, usually in a substantially horizontal position, and a planter box 21 is disposed thereon by inserting the post 11 through the opening 54 and sliding the box 21 along the post 11 until it reaches its approximate final position on the post. Thereafter, a portion of conductor 66 is bent into the compartment 42 and the connector 67 is secured thereto. The plug 68 is then inserted into the connector 67. The bolts 58 and 59 are then extended through the slot 16 in the manner previously described and then the wing-nuts 63 and 64 are applied thereto to secure the planter box in position. Thereafter, the others of the planter boxes are mounted on the pole in generally similar fashion. The post 11 is then moved into a substantially vertical position. By depressing the plunger 13, the post can be located in the appropriate position and then the plunger 13 is allowed to move upwardly under the urging of the spring so that it firmly but releasably engages the ceiling of the room. This positions the post in a fixed, but adjustable, position within the room. Minor adjustments in the vertical position of the planter boxes 21 can be made at this time by loosening the wing-nuts and moving the boxes upwardly or downwardly as desired. The planting material, such as dirt, can then be placed into the plant-receiving zones 38 of the planter boxes and the plants placed therein. Upon the connection of the conductor 66 to a suitable source of electrical potential, the lights within the respective planter boxes will be lit. If desired, a separate switch may be provided on each box to control this lighting or, alternatively, same can be controlled merely by removing the plug connected to conductor 66 from the electrical receptacle with which it normally cooperates.

It will be apparent that the boxes 21 can be adjusted vertically along the pole if desired and the only changes required to do this are to remove the connectors 67 from the cord 66 and to loosen the wing-nuts 63 and 64 and adjust the bolts 58 and 59 in the slot 16 along the post. The clamp-on connectors 67 then can be re-attached to the cord 66.

Thus, it will be apparent that the invention provides a relatively, inexpensive, portable and decorative planter structure which may be moved from place to place around the room and the planter boxes of which may be moved vertically as may be desired or required as to meet various requirements. Further, the casings 31 by which the boxes are mounted on the post may be used with a wide variety of planter boxes.

While a particular preferred embodiment of the invention has been disclosed, the invention contemplates such changes or modifications therein as lie within the scope of the appended claims.

What is claimed is:

1. A planter structure comprising:
    a post having a vertically extending slot therein;
    a plurality of planter boxes mounted at vertically spaced intervals alongsaid post, each of said boxes having an opening therethrough through which said post extends;
    a casing disposed within each of said planter boxes and secured thereto, said casing having wall means disposed adjacent said post; and
    fastening means extending through said wall means and into said slot and releasably securing said box in vertically adjustable position on said post.

2. A planter structure according to claim 1 wherein said casing comprises a pair of spaced side walls and an end wall and said wall means is a divider wall extending between said side walls and dividing said casing into a first compartment through which said post extends and a second compartment; and
    a light fixture disposed within said second compartment.

3. A planter structure according to claim 2 wherein said post has a second slot therein;
    an electrical conductor disposed within said second slot, said conductor having releasable electrical connection means secured thereto in said first compartment in each of said planter boxes;
    and a further conductor in each of said planter boxes extending from said electrical connection means to the light fixture thereof.

4. A planter structure according to claim 2 including a translucent panel overlying said second compartment.

5. A planter structure according to claim 1 wherein said fastening means comprises a bolt having a rectangular head whose major dimension is greater than the width of the slot and whose minor dimension is less than the width of the slot so that the head of the bolt may be extended into said slot and then rotated through an angle of approximately 90 degrees so that said bolt is thereafter prevented from moving through said slot, said bolt extending through said wall means;
    and means engageable with said bolt for releasably locking same in fixed, but vertically adjustable, position within said slot.

6. A planter structure adapted for mounting on a post, comprising:
    a box having a base wall and upwardly extending side walls, said base wall having an opening therethrough;

a casing disposed within said box, said casing having a dividing wall extending upwardly from a point adjacent one side of said opening and dividing said casing into a post-receiving compartment and a light fixture-receiving compartment;

means extending through said dividing wall for securing same to a post; and a light fixture mounted within said light fixture-receiving compartment.

References Cited in the file of this patent

UNITED STATES PATENTS

| | | |
|---|---|---|
| 1,224,189 | Maltby | May 1, 1917 |
| 2,803,923 | Pratt | Aug. 27, 1957 |